(12) United States Patent
Takata et al.

(10) Patent No.: US 11,019,096 B2
(45) Date of Patent: May 25, 2021

(54) COMBINING APPARATUS, COMBINING METHOD, AND COMBINING PROGRAM

(71) Applicant: NIPPON TELEGRAPH AND TELEPHONE CORPORATION, Tokyo (JP)

(72) Inventors: Yuta Takata, Musashino (JP); Mitsuaki Akiyama, Musashino (JP); Takeshi Yagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 45 days.

(21) Appl. No.: 16/476,304

(22) PCT Filed: Aug. 9, 2017

(86) PCT No.: PCT/JP2017/028900
§ 371 (c)(1),
(2) Date: Jul. 8, 2019

(87) PCT Pub. No.: WO2018/131199
PCT Pub. Date: Jul. 19, 2018

(65) Prior Publication Data
US 2019/0356675 A1 Nov. 21, 2019

(30) Foreign Application Priority Data
Jan. 11, 2017 (JP) .............................. JP2017-002379

(51) Int. Cl.
*H04L 29/06* (2006.01)
(52) U.S. Cl.
CPC ................................ *H04L 63/145* (2013.01)

(58) Field of Classification Search
CPC ...................................................... H04L 63/145
USPC ............................................................ 726/23
See application file for complete search history.

(56) References Cited

U.S. PATENT DOCUMENTS

| 2005/0283836 | A1* | 12/2005 | Lalonde | G06F 21/563 726/24 |
| 2008/0127343 | A1* | 5/2008 | Baker | G06F 21/55 726/23 |
| 2008/0320498 | A1* | 12/2008 | Maykov | G06F 16/951 719/320 |

(Continued)

FOREIGN PATENT DOCUMENTS

JP 2016525760 A 8/2016

OTHER PUBLICATIONS

Notice of Reasons for Refusal issued in Japanese Application No. 2018-561794 dated Nov. 12, 2019.

(Continued)

*Primary Examiner* — Andrew J Steinle
*Assistant Examiner* — Sakinah White Taylor
(74) *Attorney, Agent, or Firm* — Xsensus LLP

(57) ABSTRACT

A combining apparatus has an acquiring unit that acquires script codes included in a website and having been divided and written at plural locations in the website; and a code combining unit that combines a plurality of the divided script codes written therein, based on a dependency between data in the divided script codes written therein acquired by the acquiring unit, or a dynamic generation relation arising from execution of the divided script codes written therein.

5 Claims, 5 Drawing Sheets

(56) References Cited

U.S. PATENT DOCUMENTS

| | | | | |
|---|---|---|---|---|
| 2009/0019105 | A1* | 1/2009 | Sebastian | G06F 16/9566 709/202 |
| 2011/0289582 | A1 | 11/2011 | Kejriwal et al. | |
| 2014/0237447 | A1* | 8/2014 | Santos Luaces | G06F 8/71 717/110 |
| 2014/0337816 | A1* | 11/2014 | Chiluvuri | G06F 8/36 717/107 |
| 2014/0373087 | A1* | 12/2014 | Ciu | H04L 63/145 726/1 |
| 2016/0314301 | A1* | 10/2016 | Johns | G06F 21/577 |
| 2017/0300306 | A1* | 10/2017 | De | G06F 8/427 |
| 2017/0359387 | A1* | 12/2017 | Barday | H04L 63/04 |

OTHER PUBLICATIONS

International Search Report and Written Opinion dated Nov. 7, 2017 for PCT/JP2017/028900 filed on Aug. 9, 2017, 6 pages including English Translation of the International Search Report.

Lu et al., "Blade: An Attack—Agnostic Approach for Preventing Drive-By Malware Infections", pp. 1-12.

Nova et al., "Detection and Analysis of Drive-by-Download Attacks and Malicious JavaScript Code", 10 pages.

Takata et al., "MineSpider: Extracting Hidden URLs behind Evasive Drive-by Download Attacks", The Institute of Electronics, Information and Communication Engineers, IEICE Trans. Inf. & Syst., vol. E99-D, No. 4, Apr. 2016, pp. 1-13.

Kapravelos et al.,"Revolver: An Automated Approach to the Detection of Evasive Web-based Malware", 15 pages.

Curtsinger et al., "Zozzle: Fast and Precise In-browser JavaScript Malware Detection", 16 pages.

Takata et al., "Website Forensic Investigation to Identify Evidence and Impact of Compromise", NTT Secure Platform Laboratories, Japan, pp. 1-20.

Lu et al., "Automatic Simplification of Obfuscated JavaScript Code: A Semantics-Based Approach", 2012 IEEE Sixth International Conference on Software Security and Reliability (SERE), Jun. 20, 2012, pp. 31-40.

Extended European Search Report dated Jul. 3, 2020 in European Patent Application No. 17891858.7, 7 pages.

* cited by examiner

FIG.3

| TIME STAMP | EXECUTION SOURCE (src) | EXECUTION METHOD | EXECUTION DESTINATION (dst) |
|---|---|---|---|
| 2017/1/1 00:00:00 | http://a.example/ | rendered_exec | C1 |
| 2017/1/1 00:00:01 | http://a.example/ | rendered_exec | C2 |
| 2017/1/1 00:00:02 | http://a.example/ | rendered_exec | C3 |
| 2017/1/1 00:00:03 | http://a.example/ | rendered_exec | C4 |
| 2017/1/1 00:00:04 | C4 | eval | C5 |
| 2017/1/1 00:00:05 | C3 | location.href | http://b.example/ |

COMBINING APPARATUS, COMBINING METHOD, AND COMBINING PROGRAM

CROSS-REFERENCE TO RELATED APPLICATIONS

The present application is based on PCT filing PCT/JP2017/028900, filed Aug. 9, 2017, which claims priority to JP 2017-002379, filed Jan. 11, 2017, the entire contents of each are incorporated herein by reference.

FIELD

The present invention relates to a combining apparatus, a combining method, and a combining program.

BACKGROUND

A drive-by download attack is an attack where a client that has made access to a website is transferred to a website by use of mainly HyperText Markup Language (HTML) or JavaScript (registered trademark) and is thereafter transferred to a malicious website that executes an attack code. When the client makes access to the malicious website, the attack code that abuses vulnerability of a web browser (hereinafter, called the "browser") or a plug-in of the browser (hereinafter, called the "plug-in") is executed, and download and installation of a malicious program (malware), such as a computer virus, are performed. A uniform resource locater (URL) of the website where the attack code is executed or the website where the malware is downloaded from is called a malicious URL.

Methods of detecting drive-by download attacks include a method of detecting a change caused in a file system by making access to a malicious website through a browser of a real system (hereinafter, called the "real browser") and downloading and installing malware (see, for example, Non-Patent Literature 1). Furthermore, a method of detecting malicious JavaScript by executing JavaScript through an emulator (hereinafter, called the "pseudo browser") of a browser and analyzing results of the execution (see, for example, Non-Patent Literature 2) is another one of methods of detecting drive-by download attacks.

Against these detection methods, an attacker improves the attack success rate by: identifying (hereinafter, called "browser fingerprinting") types and versions of clients that have made access before the clients are transferred to a malicious URL, and changing the control flow of JavaScript so as to transfer only a predetermined client to be attacked to the malicious URL (see, for example, Non-Patent Literature 3).

In addition, an attacker may use a code (hereinafter, called the "analysis avoiding code") that avoids or interferes with analysis performed by existing techniques, by using plug-in functions or generating intentional exception handling (see, for example, Non-Patent Literature 4).

Most of the above described malicious websites that use plural transfers, a browser fingerprinting code, or an analysis avoiding code are automatically constructed by tools called exploit kits.

Methods of analyzing JavaScript have been conventionally proposed (see, for example, Non-Patent Literature 4 and Non-Patent Literature 5). For example, the method described in Non-Patent Literature 5 is a method of detecting malicious JavaScript by extracting feature values of codes and causing a classifier to learn the feature values, based on tree structures (that is, structures of the codes) of abstract syntax trees converted from nonmalicious JavaScript and malicious JavaScript serving as targets to be analyzed.

Furthermore, the method described in Non-Patent Literature 4 is a method of extracting an analysis avoiding code from differential information between: input of malicious JavaScript detected by regularly monitoring a malicious website by using the above described attack detection method; and input of JavaScript, for which its attack has become undetectable from a certain point in time due to a change made by an attacker to the malicious JavaScript. This method is applied to a case where an attacker finds a method of avoiding analysis and additionally writes the method of avoiding analysis in the existing malicious code (updates the attack method).

CITATION LIST

Non-Patent Literature

Non-Patent Literature 1: L. Lu, V. Yegneswaran, P. Porras, and W. Lee, "BLADE: An Attack-Agnostic Approach for Preventing Drive-By Malware Infections", Proc. ACM on Conference Computer and Communications Security, 2010.

Non-Patent Literature 2: M. Cova, C. Kruegel, and G. Vigna, "Detection and Analysis of Drive-by-Download Attacks and Malicious JavaScript Code", Proc. World Wide Web Conference, pp. 281 to 290, 2010.

Non-Patent Literature 3: Y. Takata, M. Akiyama, T. Yagi, T. Hariu, and S. Goto, "MineSpider: Extracting Hidden URLs Behind Evasive Drive-by Download Attacks", IEICE Trans. Information and System, vol. E99.D, no. 4, pp. 860 to 872, 2016.

Non-Patent Literature 4: A. Kapravelos, Y. Shoshitaishvili, M. Cova, C. Kruegel, and G. Vigna, "Revolver: An Automated Approach to the Detection of Evasive Web-based Malware", In Proceedings of the USENIX Security Symposium, 2013.

Non-Patent Literature 5: C. Curtsinger, B. Livshits, B. Zorn, and C. Seifert, "ZOZZLE: Fast and Precise In-Browser JavaScript Malware Detection",In Proceedings of the USENIX Security Symposium, 2011.

SUMMARY

Technical Problem

There is more than one method of executing JavaScript. For example, methods of executing JavaScript include a method of executing a code read from a different URL, a method of executing a code written in a script tag, and a method of executing a dynamically generated code.

Malicious websites include a website that interferes with analysis by: having finely divided JavaScript written in scrip tags thereof; or having, written therein, a meaningless calculation dummy code or a dummy code defining unused variable and function.

However, conventional analysis methods have sometimes been unable to detect malicious JavaScript for a code that has been divided or a code that has been dynamically generated.

For example, the method described in Non-Patent Literature 5 is a method where the feature values are extracted from the entire malicious code. Therefore, the method described in Non-Patent Literature 5 has had a problem of not being able to acquire feature values sufficiently contributing to the classification from codes finely divided from JavaScript and written in script tags. Furthermore, the method described in Non-Patent Literature 4 has had a problem of excessively combining a dummy code not required to be analyzed because codes having sizes equal to or less than a threshold are simply combined together and analyzed in this method.

Therefore, to analyze codes that have not served as targets to be analyzed by conventional methods, divided codes or dynamically generated codes need to be made into codes larger in meaningfulness and size.

The present invention has been made in view of the above, and an object thereof is to provide a combining apparatus, a combining method, and a combining program, which are able to make a size of script codes into a size enabling the script codes to be a target to be analyzed, the script codes having been divided and written at plural locations in a website and having been unable to be a target to be analyzed thus far.

Solution to Problem

A combining apparatus, includes: an acquiring unit that acquires script codes included in a website and having been divided and written at plural locations in the website; and a code combining unit that combines a plurality of the divided script codes written therein together, based on a dependency between data in the divided script codes written therein acquired by the acquiring unit, or a dynamic generation relation arising from execution of the divided script codes written therein.

Advantageous Effects of Invention

According to the present invention, a size of script codes is able to be made into a size that enables the script codes to be a target to be analyzed, the script codes having been divided and written at plural locations in a website and having been unable to be a target to be analyzed thus far.

BRIEF DESCRIPTION OF DRAWINGS

FIG. 3 is a diagram for explanation of script code execution history information illustrated in FIG. 2.

DESCRIPTION OF EMBODIMENTS

Described hereinafter in detail by reference to the drawings is an embodiment of the present invention. The present invention is not limited by the embodiment. Furthermore, any portions that are the same are assigned with the same reference sign, throughout the drawings.

EMBODIMENT

The embodiment of the present invention will be described below. Described as the embodiment of the present invention are a combining apparatus, a combining method, and a combining program that make a size of script codes into a size that enables the script codes to be a target to be analyzed, the script codes having been divided and written at plural locations in a website, for analysis of the content and script of the website. Described first of all is an outline of the combining apparatus according to the embodiment.

Configuration of Combining Apparatus

Figure 1:
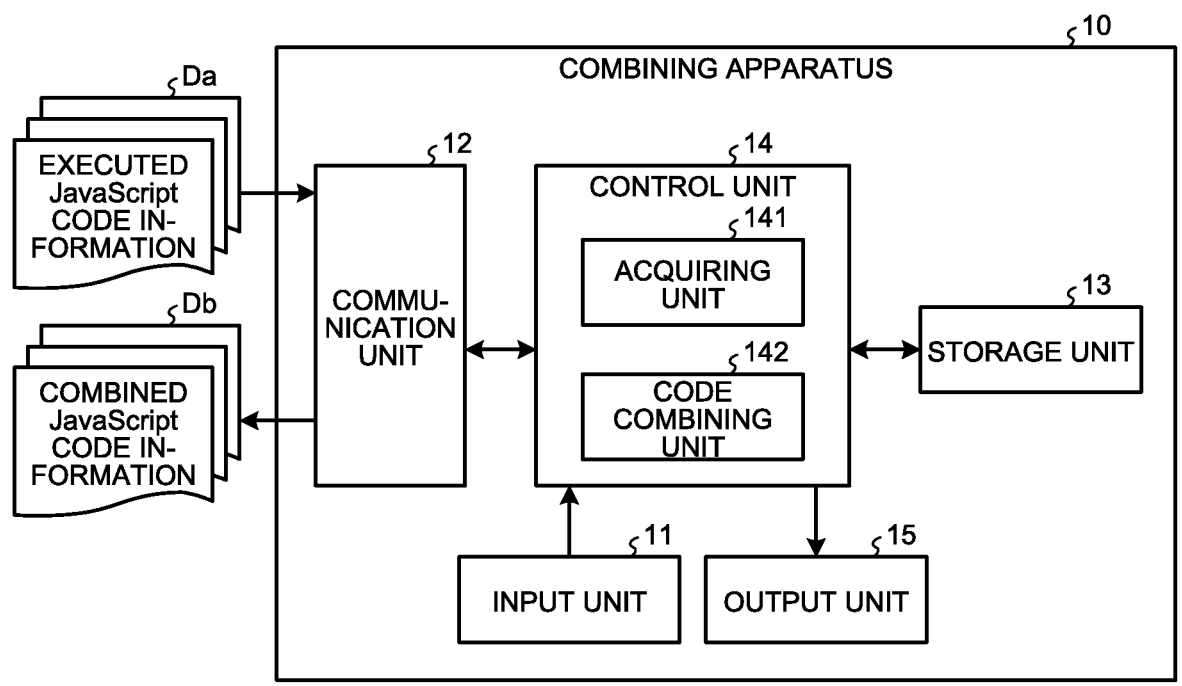
FIG. 1 is a block diagram illustrating a configuration of a combining apparatus according to an embodiment.

FIG. 1 is a block diagram illustrating a configuration of the combining apparatus according to the embodiment. As illustrated in FIG. 1, a combining apparatus 10 has an input unit 11, a communication unit 12, a storage unit 13, a control unit 14, and an output unit 15. With respect to the embodiment, a case where JavaScript codes of a script code are combined into a code having a size that enables the code to be a target to be analyzed will be described as an example, the JavaScript codes being used in a web browser.

The input unit 11 is an input interface that receives various operations from an operator of the combining apparatus 10. For example, the input unit 11 is formed of any of input devices, such as a touch panel, a sound input device, a keyboard, and a mouse.

The communication unit 12 is a communication interface that transmits and receives various types of information to and from another device connected thereto via a network or the like. The communication unit 12 is realized by a network interface card (NIC) or the like, and carries out communication between the other device and the control unit 14 via an electric communication line, such as a local area network (LAN) or the Internet.

Specifically, the communication unit 12 inputs executed JavaScript code information Da acquired upon access to a URL via a browser, to the control unit 14 via a network or the like. Malicious websites include a website that interferes with analysis by having, written therein, a JavaScript code that has been divided into plural codes. The executed JavaScript code information Da is information including JavaScript divided into pieces that are written at plural locations in a website likely to be a malicious website.

According to this embodiment, for example, the communication unit 12 inputs, to the control unit 14, executed JavaScript code information acquired by a pseudo browser (see, for example, Y. Takata, M. Akiyama, T. Yagi, T. Yada, and S. Goto in "Website Forensic Investigation to Identify Evidence and Impact of Compromise," In Proceedings of the International Conference on Security and Privacy in Communication Networks (SecureComm), 2016). The executed JavaScript code information is not necessarily acquired by the pseudo browser, and may be acquired by any real browser that is able to acquire JavaScript code information. That is, not being limited to the pseudo browser, any real browser that is able to acquire executed JavaScript code information may be used as a browser.

Furthermore, the communication unit 12 outputs, via a network or the like, combined JavaScript code information Db to an analyzing device that analyzes the content and script of a website, the combined JavaScript code information Db being a JavaScript code that has been acquired by combining performed by a code combining unit 142, the JavaScript code thus having a size that enables the JavaScript code to be a target to be analyzed. If the combining apparatus 10 itself has an analyzing function for analyzing the content and script of the website, the combined JavaScript code information Db is output from the code combining unit 142 to this analyzing function.

The storage unit 13 is realized by: a semiconductor memory device, such as a random access memory (RAM) or a flash memory; or a storage device, such as a hard disk or an optical disk, and stores therein: a processing program that causes the combining apparatus 10 to operate; and data used when the processing program is being executed.

The control unit 14 has an internal memory for storing therein: a program prescribing various processing procedures; and necessary data, and executes various types of processing through them. For example, the control unit 14 is an electronic circuit, such as a central processing unit (CPU) or a micro processing unit (MPU). The control unit 14 has an acquiring unit 141 and the code combining unit 142.

The acquiring unit 141 acquires script codes that are included in a website and have been divided and written at plural locations in the website. The acquiring unit 141 acquires, based on a JavaScript code information execution history, the divided script codes written therein, in the order that these script codes are executed.

The code combining unit 142 combines a plurality of the divided script codes written therein, based on a dependency between data in the divided script codes written therein and acquired by the acquiring unit 141, or a dynamic generation relation arising from execution of the divided script codes written therein and acquired by the acquiring unit 141. In other words, the code combining unit 142 combines the divided codes or a dynamically generated code included in executed JavaScript code information acquired through a browser, into a more meaningful code having a larger size that enables the code to be a target to be analyzed.

The output unit 15 is realized by, for example: a display device, such as a liquid crystal display; a printing device, such as a printer; or an information communication device. The output unit 15 outputs a result of the combining, a result of the analysis, or the like, to an operator.

Processing of Code Combining Unit

Figure 2:
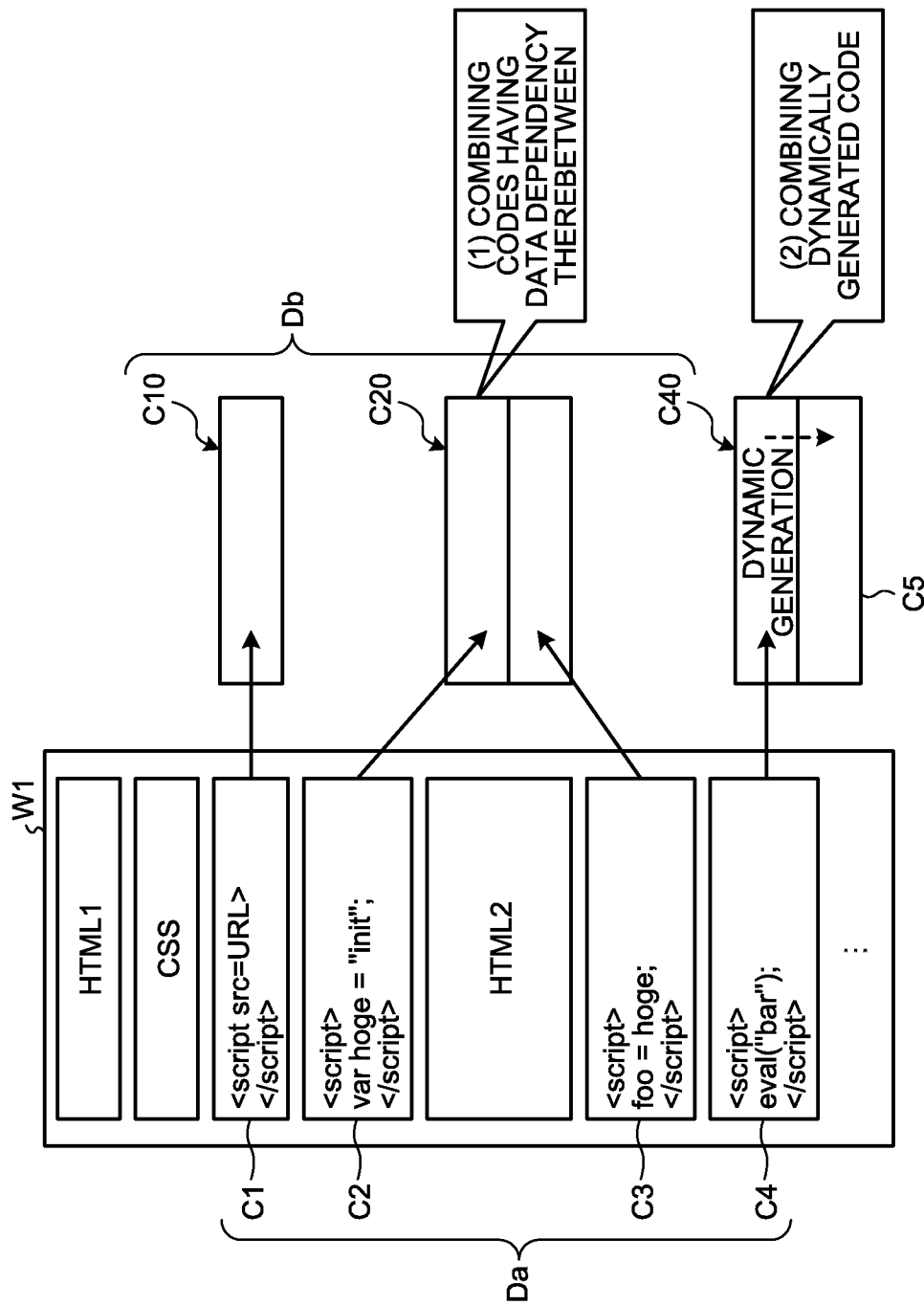
FIG. 2 is a diagram for explanation of processing by a code combining unit illustrated in FIG. 1.

Specifically described next is processing by the code combining unit 142. FIG. 2 is a diagram for explanation of processing by the code combining unit 142 illustrated in FIG. 1. JavaScript included in a website configuration W1 is illustrated at the left side of FIG. 2, as an example of the executed JavaScript code information Da, and the combined JavaScript code Db combined by the code combining unit 142 is illustrated at the right side of FIG. 2. FIG. 3 is a diagram for explanation of JavaScript code execution history information D1 acquired from the website configuration W1 illustrated in FIG. 2. In FIG. 3: a URL of the website configuration W1 is assumed to be "http://a.example/"; an execution method, "rendered_exec", indicates that a JavaScript code of an execution destination was executed when access was made to a URL of an execution source; and an execution method, "eval", indicates that a JavaScript code of an execution destination was dynamically generated and executed when a JavaScript code of an execution source was executed. Furthermore, an execution method, "location.href", means that when a JavaScript code of an execution source was executed, transfer to a URL of an execution destination was performed. For example, information output by a real browser or a pseudo browser may be used as the JavaScript code execution history information D1.

Based on the JavaScript code execution history information D1 that has been held beforehand, divided JavaScript codes are input to the acquiring unit 141 in the order that these JavaScript codes are executed. The acquiring unit 141 acquires the divided JavaScript codes in the execution order, and inputs the divided JavaScript codes acquired, to the code combining unit 142. JavaScript is able to be written in plural pieces through script tags in the content of a website, and the plural pieces are respectively executed in the order that the plural pieces are read. However, as long as a data dependency or a dynamic generation relation between JavaScript codes is able to be identified, the JavaScript codes may be not executed in this execution order.

Based on the executed JavaScript code information Da, the code combining unit 142 records beforehand a variable and a function that have been defined or referred to, for each JavaScript code. In other words, the code combining unit 142 acquires definition information of a variable or a function and reference information of a variable or a function, from data in the divided JavaScript codes. If codes have a variable or a function in common, that is, when a data dependency exists between the codes, a plurality of the codes having the data dependency existing therebetween are combined together and extracted.

For example, in the example of FIG. 2, a variable, "hoge", is defined in a code C2. In a code C3, the variable, "hoge", is referred to, and a variable, "foo", is defined. Therefore, the code combining unit 142 determines that the code C2 and the code C3 have the variable, "hoge", in common. The code combining unit 142 thus generates a code 20 by combining the code C2 and the code C3 together, based on the common variable, "hoge". As described above, the code combining unit 142 generates a more meaningful code having a larger size by combining codes having a data dependency therebetween (see (1) in FIG. 2).

Furthermore, in JavaScript, by use of "document.write ("<script>code</script>");", "eval("code");", or the like, codes are able to be generated dynamically and executed. In the example of FIG. 2, with a code C4 being an execution source, a code is dynamically generated by execution of "eval("code");". In this case, the code combining unit 142 extracts the code C4 of the execution source and a code C5 that has been newly generated, from the JavaScript code execution history information D1, and generates a code C40 by combining these codes C4 and C5 together. As described above, when a code to be analyzed is a new script code dynamically generated by execution of divided script codes written therein, the code combining unit 142 generates a more meaningful code having a large size by combining an execution source code and the new code dynamically generated together (see (2) in FIG. 2).

Processing Procedure of Code Combining Process

Figure 4:
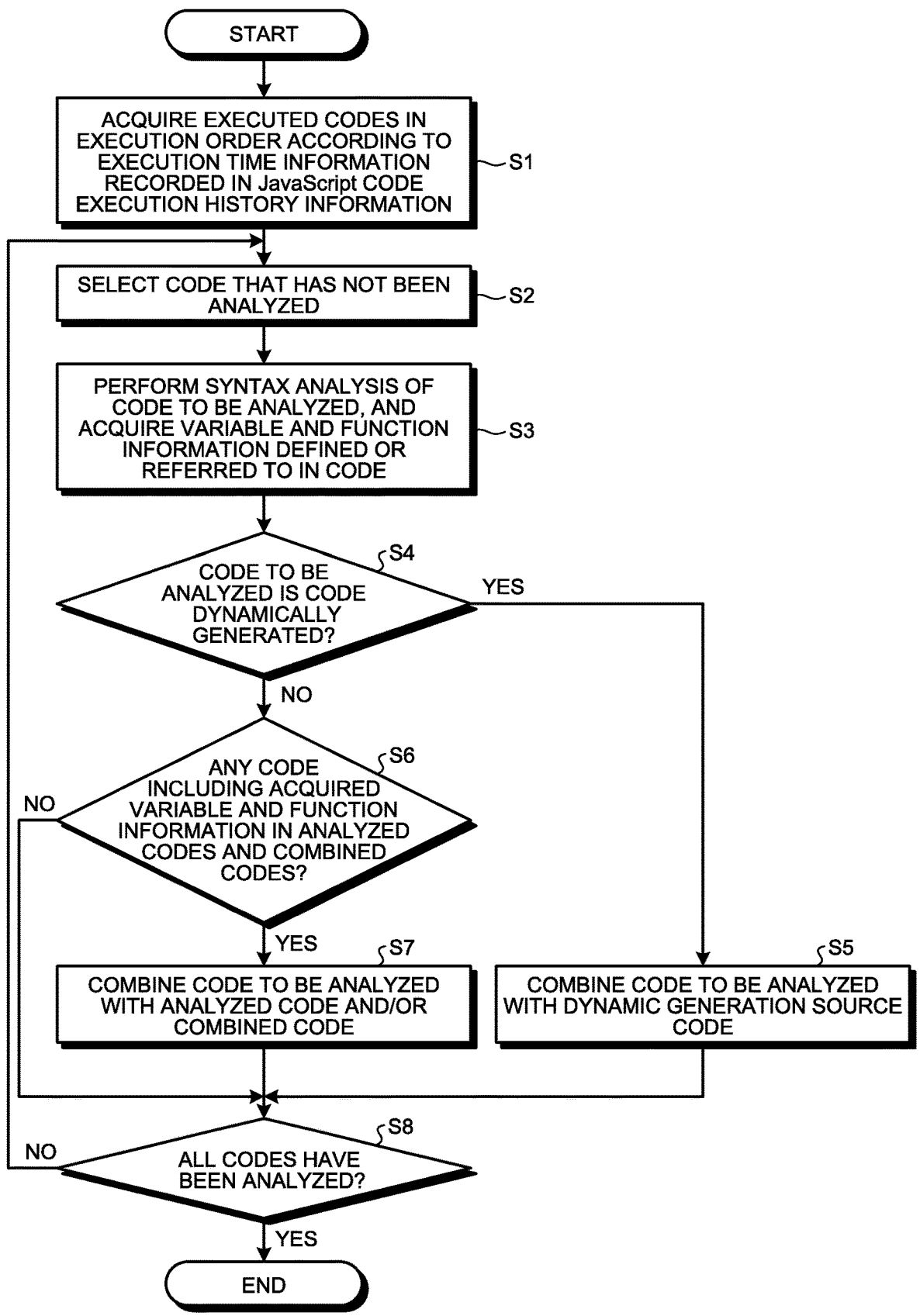
FIG. 4 is a flow chart illustrating a processing procedure of a code combining process by the combining apparatus illustrated in FIG. 1.

FIG. 4 is a flow chart illustrating a processing procedure of a code combining process by the combining apparatus 10 illustrated in FIG. 1. As illustrated in FIG. 4, firstly, based on the JavaScript code information Da executed at a website to be analyzed, the acquiring unit 141 acquires executed codes in the order that the codes are executed, according to execution time information recorded in the JavaScript code execution history information D1 (Step S1). The code combining unit 142 then selects a code that has not been analyzed yet in sequence, from the codes acquired by the acquiring unit 141 (Step S2).

The code combining unit 142 converts the code to be analyzed into, for example, an abstract syntax tree, performs syntax analysis thereon, and acquires variable and function information defined in the code or variable and function information referred to in the code (Step S3). Subsequently, based on a result of the acquisition, the code combining unit 142 determines whether or not the selected code to be analyzed is a new code that has been dynamically generated (Step S4).

If the code combining unit 142 determines that the selected code to be analyzed is a new code that has been dynamically generated (Step S4; Yes), the code combining unit 142 combines the code to be analyzed with a code of a dynamic generation source (Step S5).

On the contrary, if the code combining unit 142 determines that the selected code to be analyzed is not a code that has been dynamically generated (Step S4; No), the code combining unit 142 determines whether or not there is any code including the variable and function information acquired at Step S3 in any already analyzed code that has been analyzed already and in any already combined code (Step S6).

If the code combining unit 142 determines that there is a code including the acquired variable and function information in any already analyzed code and any already combined code (Step S6; Yes), the code combining unit 142 combines the selected code to be analyzed with the analyzed code and/or combined code (Step S7).

On the contrary, if the code combining unit 142 determines that there is no code including the acquired variable and function information in any already analyzed code and any already combined code (Step S6; No), that is, when the already analyzed codes and the already combined codes are codes that do not include the variable and function information acquired at Step S3, the code combining unit 142 proceeds to Step S8. As Step S8, the code combining unit 142 determines whether or not all of the codes acquired at Step S1 have been analyzed (Step S8).

If the code combining unit 142 determines that not all of the codes acquired at Step S1 have been analyzed (Step S8; No), the code combining unit 142 returns to Step S2 and continues processing on the next code that has not been analyzed yet. On the contrary, if, at Step S8, the code combining unit 142 determines that all of the codes acquired at Step S1 have been analyzed (Step S8; Yes), the code combining unit 142 ends the code combining process.

Effects Of Embodiment

As described above, according to the embodiment, even if script codes included in a website have been divided and written at plural locations in the website; based on a dependency between data in the divided script codes written therein or a dynamic generation relation arising from execution of the divided script codes written therein, a plurality of the divided script codes written therein are combined together.

That is, according to the embodiment, divided codes or a dynamically generated code are/is able to be formed into a more meaningful code having a larger size enabling the code to be analyzed. In other words, script codes that have been divided and written at plural locations in a website are able to be made into a code having a size that enables the code to be a target to be analyzed, the script codes having been unable to be a target to be analyzed thus far.

Therefore, by inputting JavaScript code information executed during a website access, even if JavaScript has been written in divided codes, the divided codes are able to be combined together, the JavaScript code information having been acquired by a pseudo browser. As described above, according to the embodiment, based on context, such as a data dependency or a dynamic generation relation, codes are combined together into a code having a size that enables the code to be a target to be analyzed; and thus as compared to a conventional method, feature values larger in quantity of information that sufficiently contribute to classification are able to be extracted. Furthermore, according to the embodiment, since codes are combined based on a data dependency or a dynamic generation relation, any dummy code not required to be analyzed is able to be eliminated from targets to be analyzed.

Therefore, according to the embodiment, by manually analyzing a code resulting from combining and having a size that enables the code to be a target to be analyzed, based on a data dependency or a dynamic generation relation; as compared to a conventional method, identification of any analysis avoiding code, generation of a signature for malicious website detection, improvement in simulation performance of a pseudo browser, and the like are able to be realized.

System Configuration or the Like

Each component of the devices is functionally and conceptionally illustrated in the drawings, and is not necessarily physically configured as illustrated in the drawings. That is, specific modes of separation and integration of the devices are not limited to those illustrated in the drawings, and depending on various loads, use situations, and the like, all or a part of the devices may be configured to be functionally or physically separated or integrated in arbitrary units. Furthermore, all or any part of the processing functions executed by the devices may be realized by a CPU and a program analyzed and executed by the CPU, or may be implemented as hardware by wired logic.

Furthermore, in the above described processing according to the embodiment, all or a part of any processing described as being executed automatically may be executed manually, or all or a part of any processing described as being executed manually may be executed automatically by a known method. In addition, unless otherwise noted herein, any processing procedure, control procedure, specific names, and information including various data and parameters, which have been described above and illustrated in the drawings may be arbitrarily modified.

Program

Figure 5:
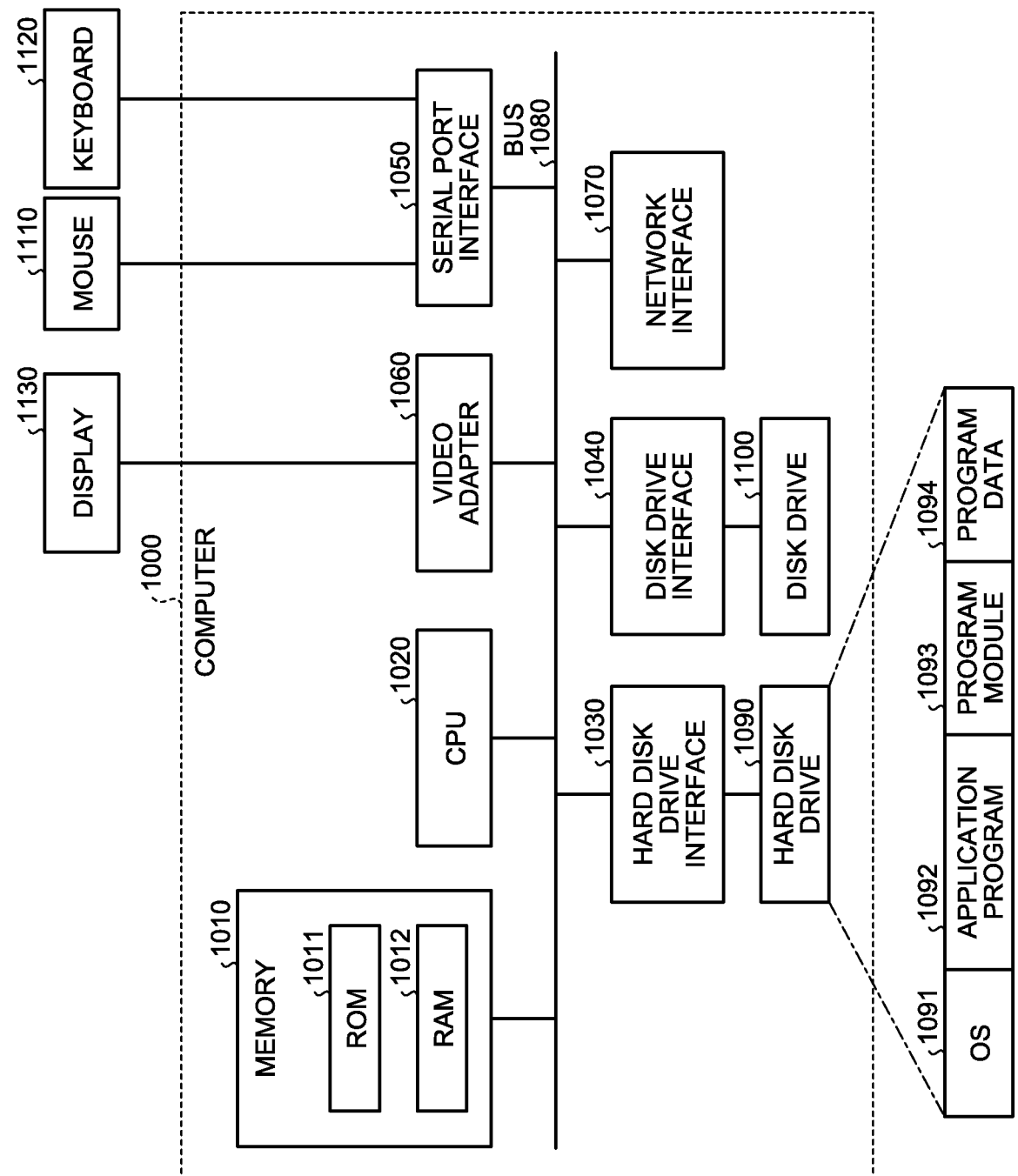
FIG. 5 is a diagram illustrating an example of a computer where the combining apparatus is realized by execution of a program.

FIG. 5 is a diagram illustrating an example of a computer where the combining apparatus 10 is realized by execution of a program. A computer 1000 has, for example, a memory 1010 and a CPU 1020. Furthermore, the computer 1000 has a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a RAM 1012. The ROM 1011 stores therein, for example, a boot program, such as a basic input output system (BIOS). The hard disk drive interface 1030 is connected to a hard disk drive 1090. The disk drive interface 1040 is connected to a disk drive 1100. For example, an attachable and detachable storage medium, such as a magnetic disk or an optical disk, is inserted into the disk drive 1100. The serial port interface 1050 is connected to, for example, a mouse 1110 and a keyboard 1120. The video adapter 1060 is connected to, for example, a display 1130.

The hard disk drive 1090 stores therein, for example, an OS 1091, an application program 1092, a program module 1093, and program data 1094. That is, a program prescribing the processing by the combining apparatus 10 is implemented as the program module 1093 having, described therein, a code executable by the computer 1000. The program module 1093 is stored in, for example, the hard disk drive 1090. For example, the program module 1093 for executing processing similar to that of the functional configuration in the combining apparatus 10 is stored in the hard disk drive 1090. The hard disk drive 1090 may be substituted by a solid state drive (SSD).

Furthermore, setup data used in the above described processing according to the embodiment are stored as the program data 1094, in, for example, the memory 1010 or the hard disk drive 1090. The CPU 1020 reads, as necessary, the program module 1093 and program data 1094 stored in the memory 1010 or hard disk drive 1090 out into the RAM 1012, and executes them.

The program module 1093 and the program data 1094 are not necessarily stored in the hard disk drive 1090, and for example, may be stored in an attachable and detachable storage medium and read out by the CPU 1020 via the disk drive 1100 or the like. Instead, the program module 1093 and the program data 1094 may be stored in another computer connected via a network (LAN, WAN, or the like). The program module 1093 and the program data 1094 may then be read out from the other computer by the CPU 1020 via the network interface 1070.

The embodiment, to which the invention made by the inventors is applied, has been described above, but the present invention is not limited by the description and drawings forming a part of disclosure of the present invention through the embodiment. That is, any other embodiments, examples, operation techniques, and the like made by those skilled in the art or the like based on the embodiment are all included in the scope of the present invention.

REFERENCE SIGNS LIST

10 COMBINING APPARATUS
11 INPUT UNIT
12 COMMUNICATION UNIT
13 STORAGE UNIT
14 CONTROL UNIT
15 OUTPUT UNIT
141 ACQUIRING UNIT
142 CODE COMBINING UNIT

The invention claimed is:

1. A combining apparatus, comprising:
circuitry configured to perform:
acquiring script codes included in a website and having been divided and written at plural locations in the website; and
combining a plurality of the divided script codes written therein together, based on a dependency between data in the divided script codes written therein acquired by the acquiring, or a dynamic generation relation arising from execution of the divided script codes written therein,
wherein the combining determines whether or not a code to be analyzed is a new script code dynamically generated by execution of a written dynamic generation source code included in the divided script codes written therein, and when the code to be analyzed is the new script code, the combining combines the written dynamic execution source code and the new script code together.

2. The combining apparatus according to claim 1, wherein the combining acquires variable or function definition information and variable or function reference information from data in the divided script codes written therein, and combines, based on the acquired information, the plurality of the divided script codes written therein together.

3. The combining apparatus according to claim 1, wherein the acquiring acquires the divided script codes written therein in execution order of the script codes.

4. A combining method executed by a combining apparatus that combines divided and written script codes, the combining method including the steps of:
acquiring script codes included in a website and having been divided and written at plural locations in the website; and
combining a plurality of the divided script codes written therein together, based on a dependency between data in the acquired divided script codes written therein, or a dynamic generation relation arising from execution of the divided script codes written therein,
wherein the combining determines whether or not a code to be analyzed is a new script code dynamically generated by execution of a written dynamic generation source code included in the divided script codes written therein, and when the code to be analyzed is the new script code, the combining combines the written dynamic execution source code and the new script code together.

5. A non-transitory computer-readable recording medium having stored therein a combining program for causing a computer to execute a process comprising:
acquiring script codes included in a website and having been divided and written at plural locations in the website; and
combining a plurality of the divided script codes written therein together, based on a dependency between data in the acquired divided script codes written therein, or a dynamic generation relation arising from execution of the divided script codes written therein,
wherein the combining determines whether or not a code to be analyzed is a new script code dynamically generated by execution of a written dynamic generation source code included in the divided script codes written therein, and when the code to be analyzed is the new script code, the combining combines the written dynamic execution source code and the new script code together.

* * * * *